(12) United States Patent
Ohshima

(10) Patent No.: US 9,905,064 B2
(45) Date of Patent: *Feb. 27, 2018

(54) VEHICLE REMOTE CONTROL SYSTEM AND VEHICLE-MOUNTED APPARATUS INCORPORATED IN THE SAME

(71) Applicant: DENSO CORPORATION, Kariya, Aichi-pref. (JP)

(72) Inventor: Hiroaki Ohshima, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/951,238

(22) Filed: Nov. 24, 2015

(65) Prior Publication Data

US 2016/0148450 A1 May 26, 2016

(30) Foreign Application Priority Data

Nov. 26, 2014 (JP) .................. 2014-238977

(51) Int. Cl.
| | |
|---|---|
| *G07C 9/00* | (2006.01) |
| *B60W 30/00* | (2006.01) |
| *B60R 25/20* | (2013.01) |
| *B60R 25/24* | (2013.01) |
| *H04W 12/06* | (2009.01) |
| *H04W 12/08* | (2009.01) |

(Continued)

(52) U.S. Cl.
CPC ...... *G07C 9/00111* (2013.01); *B60R 25/2018* (2013.01); *B60R 25/24* (2013.01); *B60W 30/00* (2013.01); *H04W 12/06* (2013.01); *H04W 12/08* (2013.01); *H04W 4/008* (2013.01); *H04W 4/02* (2013.01)

(58) Field of Classification Search
CPC . G07C 9/00111; B60R 25/2018; B60R 25/24; B60W 30/00; H04W 12/06; H04W 12/08; H04W 4/008; H04W 4/02
USPC ........................................ 340/5.61
See application file for complete search history.

(56) References Cited

U.S. PATENT DOCUMENTS

| | | | | |
|---|---|---|---|---|
| 6,631,271 | B1 * | 10/2003 | Logan ..................... | G06F 3/002 340/539.13 |
| 8,751,065 | B1 * | 6/2014 | Kato .................. | H04M 1/72533 340/426.13 |

(Continued)

FOREIGN PATENT DOCUMENTS

| | | |
|---|---|---|
| JP | 2001-027063 A | 1/2001 |
| JP | 2006-347299 A | 12/2006 |

*Primary Examiner* — Edwin Holloway, III
(74) *Attorney, Agent, or Firm* — Knobbe, Martens, Olson & Bear, LLP

(57) ABSTRACT

A vehicle remote control system including an electronic key pre-registered as a device via which a vehicle can be remote-operated, and a mobile communication device pre-registered as a device that belongs to a user of the vehicle. In the system, a vehicle-mounted authentication unit is configured to determine whether or not authentication of the electronic key and the mobile communication device has succeeded, and a vehicle-mounted allowance determination unit is configured to, if it is determined by the vehicle-mounted authentication unit that the authentication of the electronic key and the mobile communication device has succeeded, allow operation of a predetermined vehicle-mounted activation unit.

8 Claims, 13 Drawing Sheets

(51) Int. Cl.
  *H04W 4/00* (2018.01)
  *H04W 4/02* (2018.01)

(56) References Cited

U.S. PATENT DOCUMENTS

| | | | | |
|---|---|---|---|---|
| 2002/0146999 | A1* | 10/2002 | Witte | B60R 25/252 455/345 |
| 2008/0136611 | A1* | 6/2008 | Benco | B60R 25/2018 340/426.3 |
| 2011/0086632 | A1* | 4/2011 | Tumey | H04M 1/66 455/421 |
| 2011/0257817 | A1* | 10/2011 | Tieman | B60R 25/24 701/2 |
| 2013/0231824 | A1* | 9/2013 | Wilson | G05D 1/0246 701/26 |
| 2014/0114504 | A1* | 4/2014 | Yamashita | B60R 25/40 701/2 |
| 2015/0279131 | A1* | 10/2015 | Nespolo | G07C 9/00182 340/5.72 |
| 2015/0281227 | A1* | 10/2015 | Fox Ivey | H04L 63/0853 713/168 |
| 2016/0144857 | A1* | 5/2016 | Ohshima | B60W 30/06 701/23 |

* cited by examiner

VEHICLE REMOTE CONTROL SYSTEM AND VEHICLE-MOUNTED APPARATUS INCORPORATED IN THE SAME

CROSS-REFERENCE TO RELATED APPLICATION

This application is based on and claims the benefit of priority from earlier Japanese Patent Application No. 2014-238977 filed Nov. 26, 2014, the description of which is incorporated herein by reference.

BACKGROUND

Technical Field

The present invention relates to a vehicle remote control system that allows a user to instruct operation of a vehicle-mounted actuation unit via a device carried by the user, and to a vehicle-mounted apparatus incorporated in the system.

Related Art

An electronic key system is known as a system that allows a vehicle door to be locked or unlocked in response to an instruction from a device carried by a vehicle user. A variety of developments to increase security have been experienced in electronic key systems. For example, the system as disclosed in Japanese Patent Application Laid-Open Publication No. 2001-027063 is configured to use a rolling code that changes in value each time as a plaintext used for authentication.

The electronic key may be stolen even if the code is modified to prevent the code from being reproduced, which is likely to permit vehicle theft. Particularly, when an automatically driven vehicle that can travel to a person carrying the electronic key when the electronic key is pressed is in practical use, it is ever more desired to improve the security of the vehicle remote control system.

In consideration of the foregoing, exemplary embodiments of the present invention are directed to providing a secure vehicle remote control system and a vehicle-mounted apparatus incorporated in the system.

SUMMARY

In accordance with a first exemplary embodiment of the present invention, there is provided a vehicle remote control system including: an electronic key pre-registered as a device via which a vehicle can be remote-operated; a mobile communication device pre-registered as a device that belongs to a user of the vehicle; a vehicle-mounted authentication unit configured to determine whether or not authentication of the electronic key and the mobile communication device has succeeded; and a vehicle-mounted allowance determination unit configured to, if it is determined by the vehicle-mounted authentication unit that the authentication of the electronic key and the mobile communication device has succeeded, allow operation of a predetermined vehicle-mounted activation unit.

In accordance with a second exemplary embodiment of the present invention, there is provided a vehicle-mounted apparatus incorporated in a vehicle remote control system, where the system includes an electronic key pre-registered as a device via which a vehicle can be remote-operated and a mobile communication device pre-registered as a device that belongs to a user of the vehicle. The apparatus includes: a vehicle-mounted authentication unit configured to determine whether or not authentication of the electronic key and the mobile communication device has succeeded; and a vehicle-mounted allowance determination unit configured to, if it is determined by the vehicle-mounted authentication unit that the authentication of the electronic key and the mobile communication device has succeeded, allow operation of a predetermined vehicle-mounted activation unit.

It is determined whether or not not only authentication of the electronic key but also authentication of the mobile communication device has succeeded. If the authentication of the electronic key and the authentication of the mobile communication device have both succeeded, operation of the activation unit is allowed or permitted. Therefore, even if only the electronic key is stolen, a person who stole the electronic key is unable to operate the activation unit, which can improve the security of the system.

DESCRIPTION OF SPECIFIC EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

Figure 1:
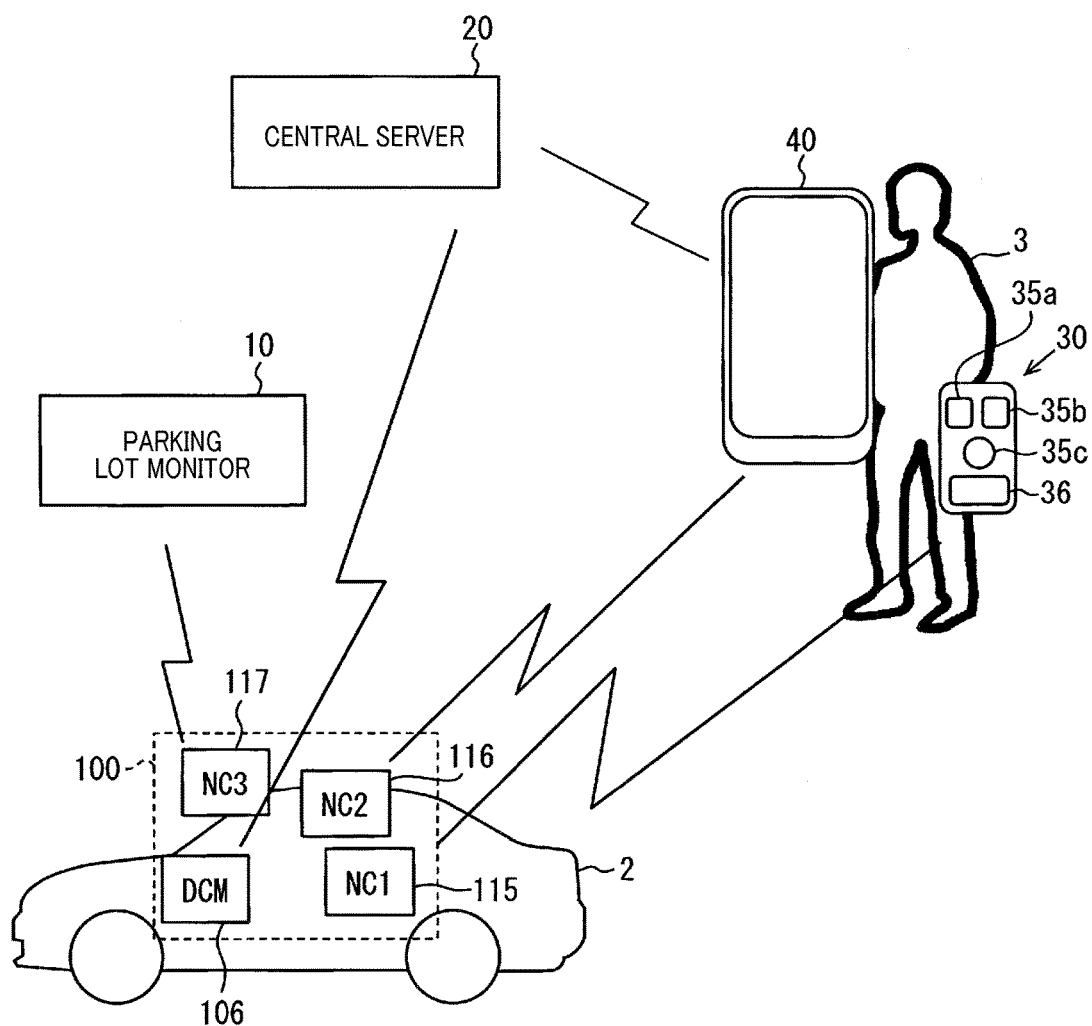
FIG. 1 is an overall diagram of a vehicle remote control system in accordance with a first embodiment of the present invention.

A vehicle remote control system 1 in accordance with a first embodiment of the present invention will now be explained with reference to FIG. 1. The vehicle remote control system 1 is configured to allow a user at a location remote from an automatically driven vehicle 2 to make the automatically driven vehicle 2 travel to the user's location. The vehicle remote control system 1 includes, as shown in FIG. 1, a parking lot monitor 10, a central server 20, an electronic key 30, a smartphone 40, and a vehicle-mounted system 100.

The vehicle-mounted system 100 is mounted in the automatically driven vehicle 2. The electronic key 30 and the smartphone 40 are carried by the user 3 of the automatically driven vehicle 2. Automatic driving of the automatically driven vehicle 2 is enabled by the vehicle-mounted system 100. Manned driving of the automatically driven vehicle 2 is enabled as well. As shown in FIG. 1, the vehicle-mounted system 100 includes a data communication module (DCM) 106, a first near field communication unit (NC1) 115, a second near field communication unit (NC2) 116, and a third near field communication unit (NC3) 117. The other components of the vehicle-mounted system 100 will be described later with reference to FIG. 4.

The DCM 106 is configured to communicate wirelessly with the central server 20 and the smartphone 40 through a public communication network. The central server 20 and the smartphone 40 are also communicable with each other through the public communication network.

The first near field communication unit 115 is configured to communicate with the electronic key 30 using frequencies in the UHF band to receive, from the electronic key 30, a signal indicative of locking or unlocking of doors of the automatically driven vehicle 2 or a signal indicative of start or stop of automatic driving.

The second near field communication unit 116 is configured to communicate wirelessly with the smartphone 40 within a communication range of tens to hundreds of meters in compliance with a near field communication standard, such as Bluetooth (registered trademark). The second near field communication unit 116 may communicate wirelessly with the electronic key 30 as well.

The third near field communication unit 117 is configured to communicate with the parking lot monitor 10 in compliance with a communication standard used for vehicle-to-infrastructure and vehicle-to-vehicle communication.

(Parking Lot Monitor)

Figure 2:
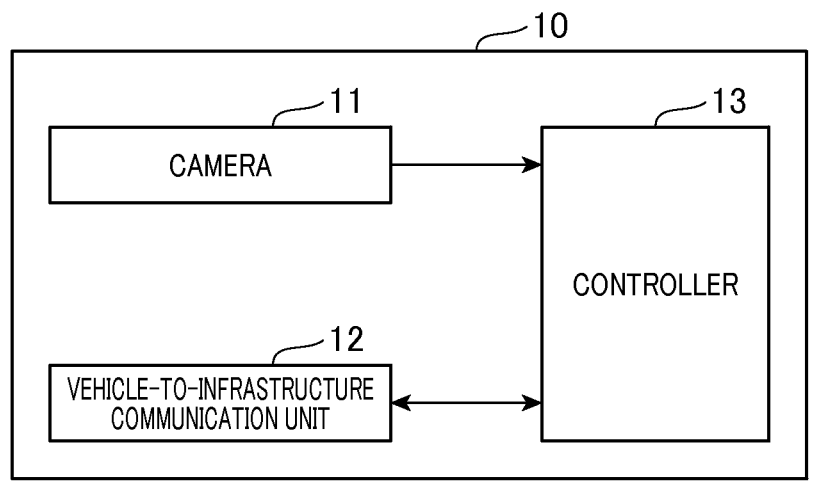
FIG. 2 is a block diagram of a parking lot monitor of FIG. 1.

The parking lot monitor 10 is installed in a parking lot to detect various parking lot information, such as information about objects present in the parking lot. As shown in FIG. 2, the parking lot monitor 10 includes a camera 11, a vehicle-to-infrastructure communication unit 12, and a controller 13.

The camera 11 is installed at a position at which the camera 11 can capture an entirety of the parking lot. If a single camera cannot capture the entirety of the parking lot, a plurality of cameras may be installed at different positions in the parking lot.

The vehicle-to-infrastructure communication unit 12 is configured to communicate with the third near field communication unit 117 of the vehicle-mounted system 100 in compliance with the communication standard used for vehicle-to-infrastructure and vehicle-to-vehicle communication, where, for example, the operating frequency is in the 700 MHz band, the 5.8 GHz band, or the 5.9 GHz band and the communication range is in the order of tens to hundreds of meters. The parking lot monitor 10 and the vehicle-mounted system 100 may communicate with each other via another communication unit than the vehicle-to-infrastructure communication unit 12.

The controller 13 may be a microcomputer including a central processing unit (CPU), a read-only memory (ROM), a random-access memory (RAM) and the like. Various functions may be implemented by the CPU executing computer programs stored in the ROM. For example, the controller 13 is configured to analyze an image captured by the camera 11 to detect a position and a type of an object present in a lane of the parking lot, and transmit the detection result via the vehicle-to-infrastructure communication unit 12. Additionally, a map of the parking lot may be transmitted via the vehicle-to-infrastructure communication unit 12.

(Central Server)

Figure 3:
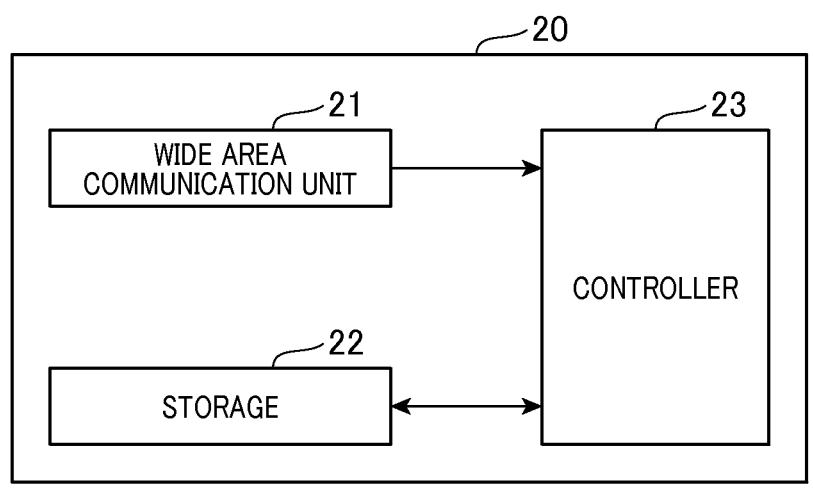
FIG. 3 is a block diagram of a central server of FIG. 1.

The central server 20 includes, as shown in FIG. 3, a wide area communication unit 21, a storage 22, and a controller 23. The wide area communication unit 21 is configured to conduct wide area communication via connection to a public communication network. The storage 22 has map data stored therein. The map data includes, as well as road data, information about locations and travel directions of lanes in each of at least some of the parking lots on the map.

The controller 23 may be a microcomputer including a central processing unit (CPU), a read-only memory (ROM), a random-access memory (RAM) and the like. The controller 23 may control the wide area communication unit 21 by the CPU executing computer programs stored in the ROM. The wide area communication unit 21 is controlled by the controller 23 to communicate with a wide area communication unit 42 of the smartphone 40 and the DCM 106 of the vehicle-mounted system 100.

(Vehicle-Mounted System)

Figure 4:
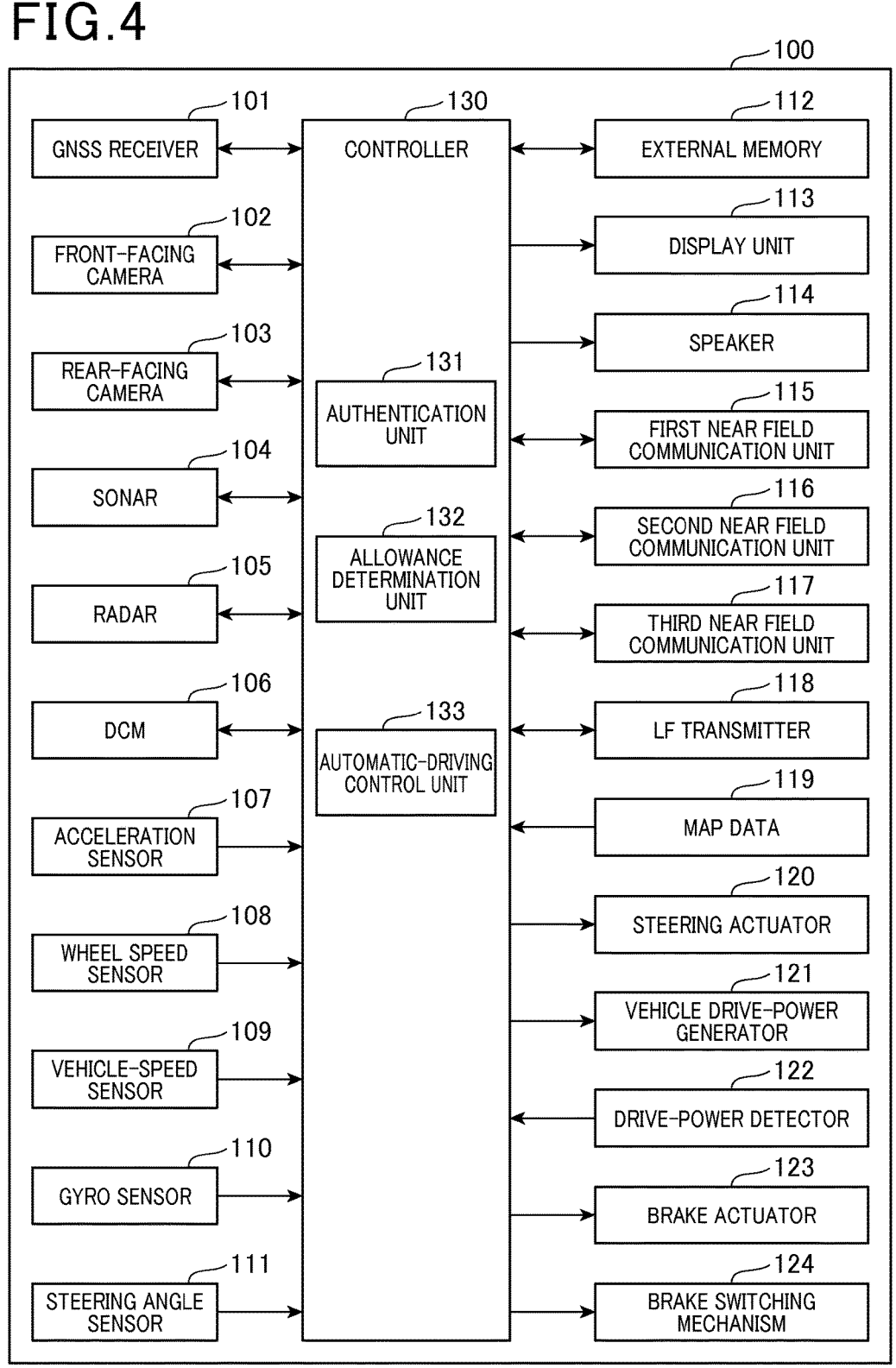
FIG. 4 is a block diagram of a vehicle-mounted system of FIG. 1.

The vehicle-mounted system 100 includes many components, as shown in FIG. 4. The controller 130 and the other components of the vehicle-mounted system 100 may be connected directly to each other, or may be connected via an on-board local area network (LAN).

The controller 130, as a vehicle-mounted apparatus, is configured to control the other components of the vehicle-mounted system 100 as shown in FIG. 4. The controller 130 may be formed of a single microcomputer including a central processing unit (CPU), a read-only memory (ROM), a random-access memory (RAM) and the like, or may be formed of a plurality of such microcomputers. The controller 130 serves as a vehicle-mounted authentication unit 131, an allowance determination unit 132, and an automatic-driving control unit 133, which are described later. Some or all of the functions of the controller 130 may be implemented by hardware, for example, by a single integrated circuit (IC) or a plurality of integrated circuits.

A GNSS receiver 101 is configured to receive radio waves from satellites of the global navigation satellite system (GNSS) to detect a location of the GNSS receiver 101 and input the detected location to the controller 130. The location detected by the GNSS receiver 101 is indicative of a location of the automatically driven vehicle 2.

A front-facing camera 102 is configured to capture an image of a predetermined area forward of the automatically driven vehicle 2. A rear-facing camera 103 is configured to capture an image of a predetermined area rearward of the automatically driven vehicle 2. The images captured by the front-facing camera 102 and the rear-facing camera 103 of the automatically driven vehicle 2 are inputted to the controller 130.

A sonar 104 is disposed on at least one of a front end face, a rear end face, and left and right side faces of the automatically driven vehicle 2 to detect a position of an object around the automatically driven vehicle 2. The position of the object detected by the sonar 104 is inputted to the controller 130.

A radar 105, which may be a millimeter-wave radar or a laser radar, is provided forward or/and rearward of the automatically driven vehicle 2. The radar 105 provided forward of the automatically driven vehicle 2 is configured to detect an object present in a probe-wave irradiated area forward of the automatically driven vehicle 2. The radar 105 provided rearward of the automatically driven vehicle 2 is configured to detect an object present in a probe-wave irradiated area rearward of the automatically driven vehicle 2. The position of the object detected by the radar 105 is inputted to the controller 130.

A data communication module (DCM) 106 is configured to conduct wide area wireless communication via a public communication network. An acceleration sensor 107 is configured to detect an acceleration experienced by the automatically driven vehicle 2. More specifically, the acceleration sensor 107 may be configured to detect an acceleration or accelerations along a single axis or two axes, preferably, accelerations along the three axes.

A wheel speed sensor 108 is configured to detect a rotational speed of each wheel of the automatically driven vehicle 2. A vehicle-speed sensor 109 is configured to detect a speed of the automatically driven vehicle 2. A gyro sensor 110 is configured to detect a rate of change in each of an azimuth angle, a roll angle, and a pitch angle of the automatically driven vehicle 2. A steering angle sensor 111 is configured to detect a steering angle of the automatically driven vehicle 2. Detected values of the acceleration sensor 107, the wheel speed sensor 108, the vehicle-speed sensor 109, the gyro sensor 110, and the steering angle sensor 111 are inputted to the controller 130.

An external memory 112 is configured to store therein codes used to authenticate the electronic key 30 and the smartphone 40. The presence of the codes stored in the external memory 112 means that the electronic key 30 and the smartphone 40 are registered with the vehicle-mounted system 100.

The display unit 113 is configured to display whether or not the automatically driven vehicle 2 is in automatic driving. When the automatically driven vehicle 2 is in automatic driving, monitoring of surroundings monitoring sensors is displayed, where the surroundings monitoring sensors include the front-facing camera 102, the rear-facing camera 103, the sonar 104, and the radar 105.

A speaker 114 is configured to, during automatic driving of the automatically driven vehicle 2, output a sound in the vicinity of the automatically driven vehicle 2 to indicate that the automatically driven vehicle 2 is in automatic driving. The speaker 114 is further configured to output a sound in the vicinity of the automatically driven vehicle 2 prior to start of automatic driving to indicate the start of automatic driving. Another speaker may be provided to output a sound in a passenger compartment.

The first near field communication unit 115, the second near field communication unit 116, and the third near field communication unit 117 have been already explained. Hence, any repetitive description about them is omitted.

A low frequency (LF) transmitter 118 is configured to transmit a baseband signal received from the controller 130 as a radio wave in the LF band of 30 kHz-300 kHz (hereinafter referred to as an LF radio wave). An antenna of the LF transmitter 118 has a communication range of several meters.

Map data 119 is stored in a predetermined storage. As with the map data stored in storage 22 of the central server 20, the map data 119 includes, as well as road data, information about lanes in the parking lots on the map. The information about lanes in the parking lots on the map may include information about whether or not there is a rule for travel directions of the lanes for at least some of the parking lots on the map. The storage storing the map data 119 may be another memory than the external memory 112, or may be included in the external memory 112.

A steering actuator 120 is configured to axially drive a rack shaft to steer the steered wheels. A vehicle drive-power generator 121, such as an internal-combustion engine, an electrical motor, or a combination of them, is configured to generate drive power for driving the automatically driven vehicle 2. A drive-power detector 122 is configured to detect the drive power generated by the drive-power generator 121. A detected drive power value is inputted to the controller 130.

A brake actuator 123 is configured to hydraulically or electrically compress a brake pad to decrease a rotational speed of a vehicle wheel.

A brake switching mechanism 124 is hydraulically or electrically controlled to switch a parking brake from locked to unlocked, and vice versa. The steering actuator 120, the drive-power generator 121, the brake actuator 123, the brake switching mechanism 124 are controlled by the controller 130.

(Electronic Key)

Figure 5:
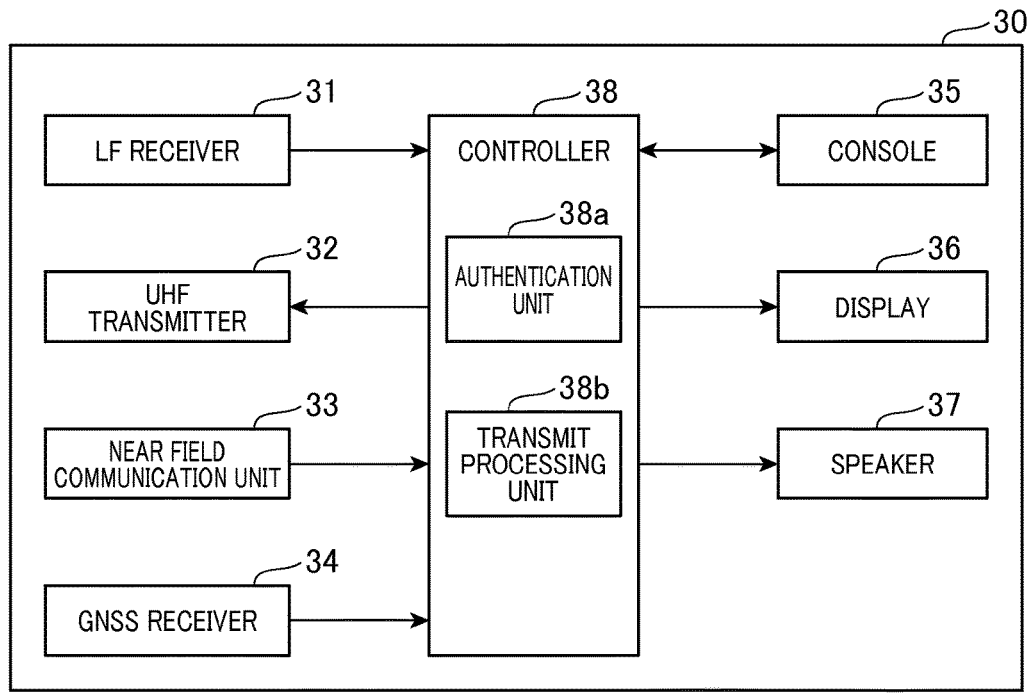
FIG. 5 is a block diagram of an electronic key of FIG. 1.

The electronic key 30 is registered with the vehicle-mounted system 100 as a device capable of remotely controlling the automatically driven vehicle 2. As shown in FIG. 5, the electronic key 30 includes an LF receiver 31, a UHF transmitter 32, a near field communication unit 33, a GNSS receiver 34, a console 35, a display 36, and a speaker 37.

The LF receiver 31 is configured to receive the LF radio wave transmitted by the LF transmitter 118 of the vehicle-mounted system 100, demodulate the received radio wave to extract the baseband signal, and output the extracted baseband signal to the controller 38. The UHF transmitter 32 is configured to modulate a signal received from the controller 38 and transmit the modulated signal as a UHF radio wave.

The near field communication unit 33 is configured to communicate wirelessly with the second near field communication unit 116 of the vehicle-mounted system 100 in compliance with the same near field communication standard as used in the second near field communication unit 116.

A GNSS receiver 34, which has the same configuration as the GNSS receiver 101 of the vehicle-mounted system 100 has, is configured to receive radio waves from the satellites of the global navigation satellite system to detect a current location of the GNSS receiver 34 based on the radio waves received from the satellites and input the detected current location to the controller 38.

A console 35 is provided with three switches 35a-35c, that is, a door lock switch 35a, a door unlock switch 35b, an automatic driving switch 35c. The door lock switch 35a is operated to transmit an instruction to lock doors of the automatically driven vehicle 2. The door unlock switch 35b is operated to transmit an instruction to unlock the doors of the automatically driven vehicle 2.

The automatic driving switch 35*c* is operated to start or stop automatic driving of the automatically driven vehicle 2. When the automatic driving switch 35*c* is activated while the automatically driven vehicle 2 is not in automatic driving, an instruction to start automatic driving of the automatically driven vehicle 2 will be transmitted. When the automatic driving switch 35*c* is activated while the automatically driven vehicle 2 is in automatic driving, an instruction to stop automatic driving of the automatically driven vehicle 2 will be transmitted. Alternatively, two switches may be separately provided, one for starting automatic driving and the other for stopping automatic driving.

A removable cover may be provided for preventing the automatic driving switch 35*c* from being operated. Ordinarily, the automatic driving switch 35*c* is covered with the removable cover and unexposed. When automatic driving is requested, the cover is removed so that the automatic driving switch 35*c* can be operated. This can prevent the automatic driving switch 35*c* from being inadvertently activated.

Various messages, such as a message indicative of whether or not the automatically driven vehicle 2 is in automatic driving, may be displayed on the display 36.

(Smartphone)

Figure 6:
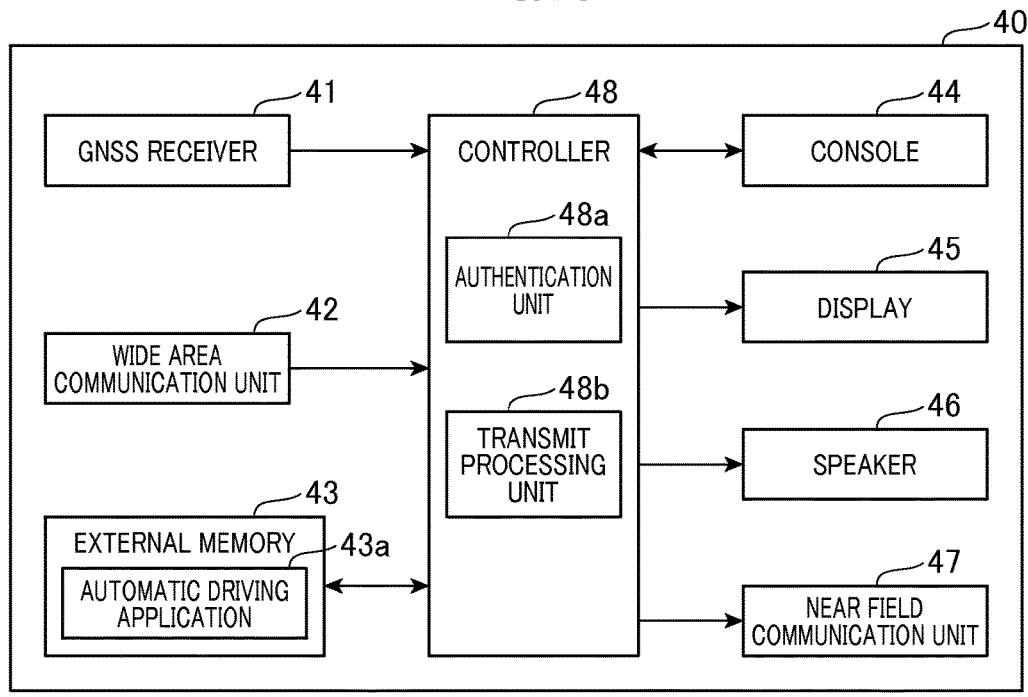
FIG. 6 is a block diagram of a smartphone of FIG. 1.

The smartphone 40 serving as a mobile communication device, as with the electronic key 30, is pre-registered with the vehicle-mounted system 100 as belonging to a user 3 of the automatically driven vehicle 2. The smartphone 40 is also registered with the electronic key 30. As shown in FIG. 6, the smartphone 40 includes a GNSS receiver 41, a wide area communication unit 42, an external memory 43, a console 44, a display 45, a speaker 46, and a near field communication unit 47.

A GNSS receiver 41, which has the same configuration as the GNSS receiver 101 or 41 of the vehicle-mounted system 100 or the electronic key 30 has, is configured to receive radio waves from the satellites of the global navigation satellite system to detect a current location of the GNSS receiver 41 based on the radio waves received from the satellites and input the detected current location to the controller 48.

The wide area communication unit 42 is configured to conduct wide area communication via connection to the public communication network. The smartphone 40 is configured to communicate with the central server 20 and the DCM 106 of the vehicle-mounted system 100 via the wide area communication unit 42.

The external memory 43 may be a writable non-volatile memory, such as a flash memory or the like. Some of applications installed on the smartphone 40 are stored in the external memory 43. In the present embodiment, an automatic driving application 43*a* is stored in the external memory 43. The automatic driving application 43*a* is executed when the user 3 guides the automatically driven vehicle 2 in automatic driving. Execution of the automatic driving application 43*a* allows the user 3 to start or stop automatic driving, determine a location of the automatically driven vehicle 2 during automatic driving, or check a condition surrounding the automatically driven vehicle 2 via the smartphone 40.

The console 44 may include a touch panel superimposed on a viewing surface of the display 45 or a mechanical switch surrounding the display 45. The user 3 operates the console 44 to provide an automatic-driving start instruction to start automatic driving or an automatic-driving stop instruction to stop automatic driving.

The display 45 is configured to, during execution of the automatic driving application 43*a*, display whether or not the automatically driven vehicle 2 is in automatic driving or the condition surrounding the automatically driven vehicle 2, or the like. The speaker 46 is configured to output a sound that indicates that automatic driving has been started or a sound that indicates automatic driving has been stopped.

The near field communication unit 47 is configured to communicate wirelessly with the second near field communication unit 116 of the vehicle-mounted system 100 and the near field communication unit 33 of the electronic key 30 in compliance with the same near field communication standard as used in the second near field communication unit 116 and the near field communication unit 33.

(Process at Startup of Automatic Driving)

Figure 7:
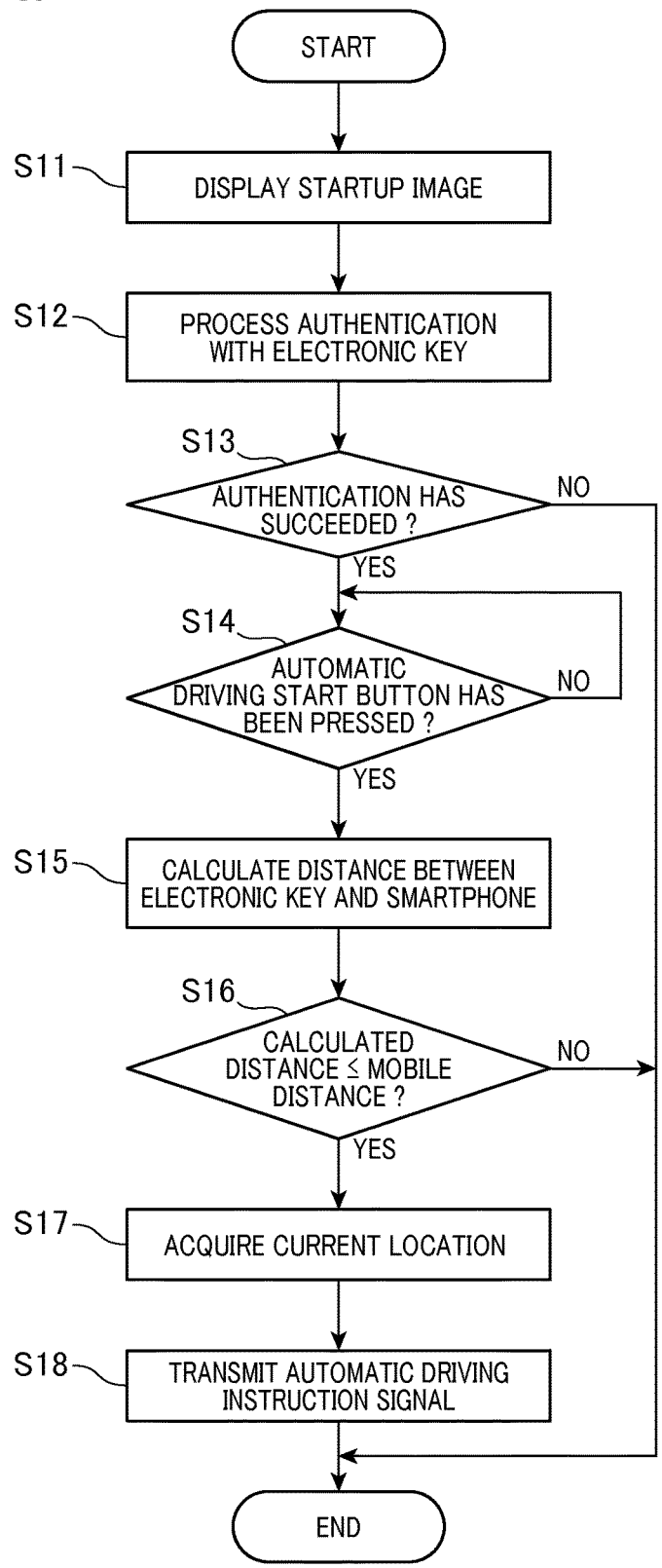
FIG. 7 is a flowchart of a process performed in a controller of a smartphone in accordance with the first embodiment.

Processes performed in the electronic key 30, the smartphone 40, and the vehicle-mounted system 100 at startup of automatic driving will now be explained. The controller 48 of the smartphone 40 performs the process shown in FIG. 7 periodically. This process is initiated when an automatic driving application 43*a* is launched. The controller 48 of the smartphone 40 includes a primary authentication unit 48*a* and a transmit processing unit 48*b*. The primary authentication unit 48*a* of the smartphone 40 is responsible for execution of steps S11-S16. The transmit processing unit 48*b* of the smartphone 40 is responsible for execution of steps S17, S18.

In step S11, a startup image is displayed on the display 45. At least an automatic driving start button for indicating start of automatic driving is displayed in the startup image.

In step S12, authentication is performed by communicating with the electronic key 30, where it is determined whether or not the smartphone 40 and the electronic key 30 have been pre-registered with each other. The registration of the smartphone 40 with the electronic key 30 and the registration of the electronic key 30 with the smartphone 40 are performed by the user 3 or an automobile retailer employee. This authentication may be performed using an automatic authentication function effected between two devices near each other such as defined in compliance with the well-known Bluetooth communication standard prior to the automatic driving start button being pressed.

In step S13, it is determined whether or not the authentication has succeeded. If it is determined that the authentication has failed, the process of FIG. 7 ends. If it is determined that the authentication has succeeded, then the process proceeds to step S14.

In step S14, it is determined whether or not the automatic driving start button displayed on the display 45 has been operated. If it is determined that the automatic driving start button displayed on the display 45 has not been operated, then step S14 is repeated. Although not shown in FIG. 7, in the event that the automatic driving application 43*a* is terminated by the user 3 while step S14 is repeatedly performed, the process of FIG. 7 ends. If it is determined that the automatic driving start button displayed on the display 45 has been operated, then the process proceeds to step S15.

In step S15, a distance between the electronic key 30 and the smartphone 40 is calculated. For example, the distance between the electronic key 30 and the smartphone 40 may be calculated based on the strength of a radio wave transmitted by the near field communication unit 33 of the electronic key 30 and then received by the near field communication unit 47 of the smartphone 40. Since the radio wave strength decreases with distance, the distance can be calculated from the radio wave strength. Alternatively, the distance between the electronic key 30 and the smartphone 40 may be calculated from the current locations detected by the GNSS receivers 34, 41 of the electronic key 30 and the smartphone 40.

In step S16, it is determined whether or not the distance calculated in step S15 is equal to or less than a threshold distance (referred to as a mobile distance). The mobile distance is a predefined distance such that, if a distance between the electronic key 30 and the smartphone 40 is equal to or less than the mobile distance, it can be assumed that both the electronic key 30 and the smartphone 40 are carried by the user 3. The mobile distance may be set to about several meters. This because that the user 3 may wear one of the electronic key 30 and the smartphone 40 and carry the other in a bag that may be placed at a short distance from the user 3.

Alternatively, step S15 may be skipped, and in step S16, it may be determined whether or not the distance between the electronic key 30 and the smartphone 40 is equal to or less than the mobile distance by comparing the strength of the received radio wave with a radio wave strength threshold. If in step S16 it is determined that the distance is greater than the mobile distance, the process of FIG. 7 ends. If in step S16 it is determined that the distance is equal to or less than the mobile distance, then the process of FIG. 7 proceeds to step S17.

In step S17, a current location of the smartphone 40 is acquired from the GNSS receiver 41. Alternatively, the current location may be acquired from the GNSS receiver 34 of the electronic key 30.

In step S18, an automatic driving instruction signal (as an authentication signal) including the current location acquired in step S17, a code used to authenticate the smartphone 40, and an automatic driving instruction signal for instructing the start of automatic driving transmitted from the near field communication unit 47 to the vehicle-mounted system 100.

Figure 8:
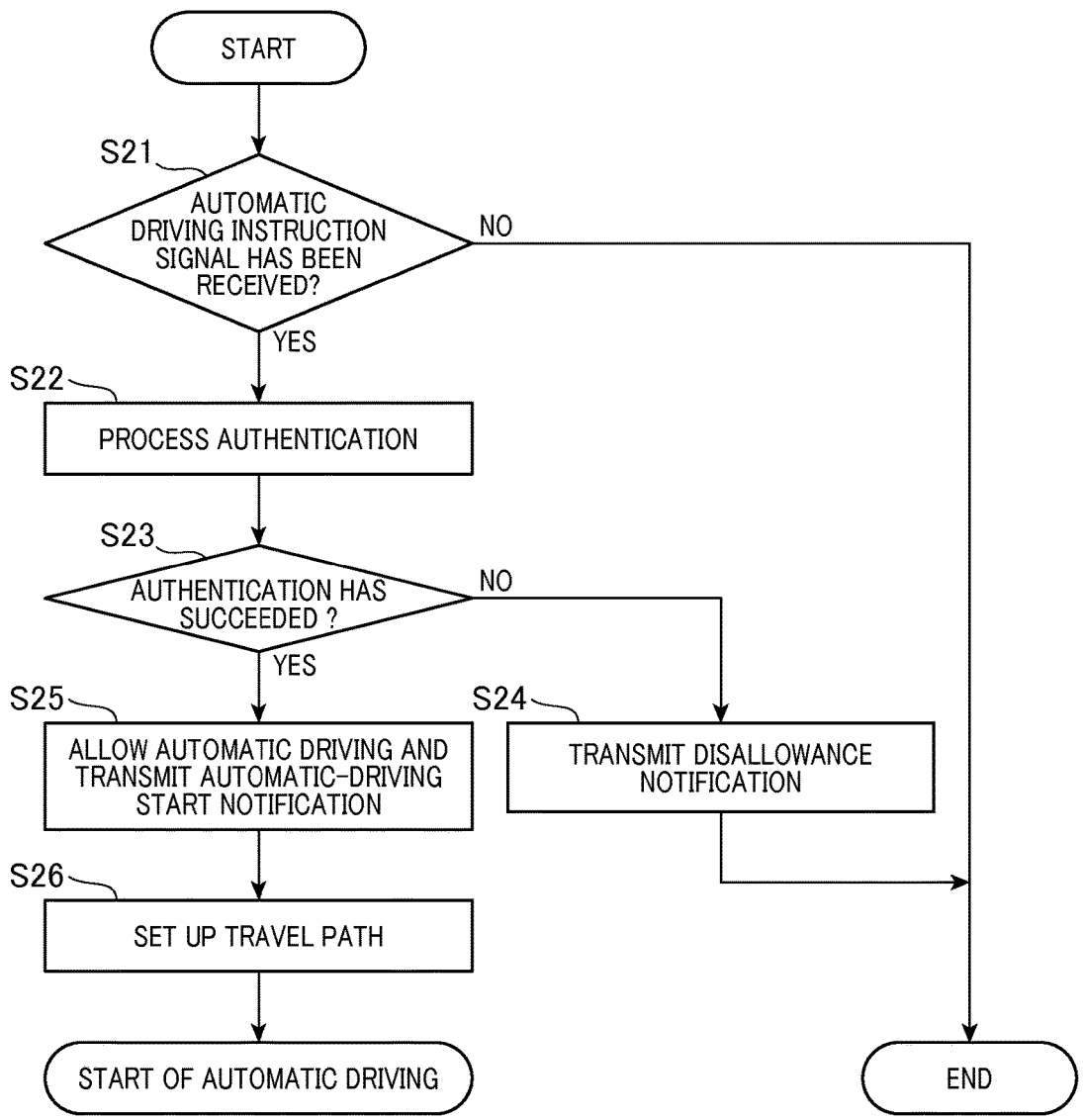
FIG. 8 is a flowchart of a process performed in a controller of a vehicle-mounted system at startup of automatic driving in accordance with the first embodiment.

The controller 130 of the vehicle-mounted system 100 performs a process shown in FIG. 8 periodically when the automatically driven vehicle 2 is in a stationary state. When an ignition switch is off, the automatically driven vehicle 2 is in the stationary state. Therefore, the process of FIG. 8 may be performed when the ignition switch is off. In addition, even when the ignition switch is on, the process of FIG. 8 may be performed when the shift position is at a parking position.

The controller 130 of the vehicle-mounted system 100 includes the authentication unit 131, the allowance determination unit 132, and the automatic-driving control unit 133. The authentication unit 131 is responsible for execution of steps S21, S22 of FIG. 8. The allowance determination unit 132 is responsible for execution of steps S23-S25 of FIG. 8. The automatic-driving control unit 133 is responsible for execution of steps S26 of FIG. 8.

In step S21, it is determined whether or not the automatic driving instruction signal has been received. As described above, the automatic driving instruction signal is transmitted step S18 of FIG. 7 from the smartphone 40. If in step S21 it is determined that the automatic driving instruction signal has not been received, then the process of FIG. 8 ends. If in step S21 it is determined that the automatic driving instruction signal has been received, then the process of FIG. 8 proceeds to step S22.

In step S22, authentication for the automatic driving instruction signal is processed, where the code included in the automatic driving instruction signal and the code stored in the external memory 112 are matched. Step S22 is allowed to be performed if in step S13 it is determined that the authentication has succeeded and if in step 16 it is determined that the distance between the electronic key 30 and the smartphone 40 is equal to or less than the mobile distance. In the case of successful authentication in step S22, it can be determined that both the authentication of the electronic key 30 and the authentication of the smartphone 40 have already succeeded. This is because the authentication in step S22 can be processed successfully only if the authentication in step S13 has succeeded and it has been determined in step S16 that the distance between the electronic key 30 and the smartphone 40 is equal to or less than the mobile distance.

In step S23, it is determined whether or not the authentication in step S22 has succeeded. If the authentication in step S22 has failed, then the process proceeds to step S24.

In step S24, a disallowance notification (as a disallowance signal) is transmitted from the second near field communication unit 116 (as a transmitter) to the smartphone 40 that has transmitted the automatic driving instruction signal. The smartphone 40 receives the disallowance notification via the near field communication unit 47. Upon receipt of the disallowance notification via the near field communication unit 47, the controller 48 controls the display 45 to display that automatic driving is disallowed. The second near field communication unit 116 may be replaced with any other communication unit that is wirelessly communicable with the smartphone 40.

If in step S23 it is determined that the authentication has succeeded, then the process proceeds to step S25, where automatic driving is determined to be allowed and an automatic-driving start notification is transmitted from the second near field communication unit 116 to the smartphone 40. Upon receipt of the automatic-driving start notification at the smartphone 40, an indication that automatic driving is about to start is displayed on the display 45.

Figure 9:
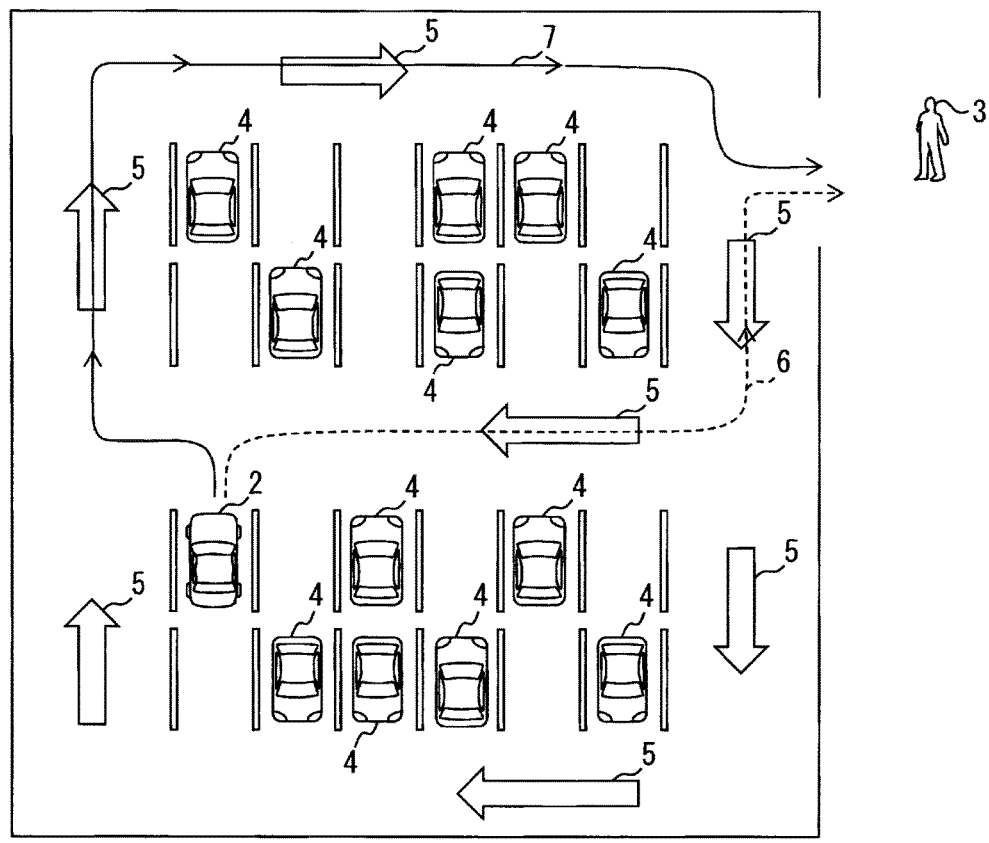
FIG. 9 is an example of a travel path along which an automatically driven vehicle travels to a user.

In step S26, a travel path 7 along which the automatically driven vehicle 2 is automatically driven to a location of the user 3 is set up. FIG. 9 is an example of the travel path 7 where the user 3 is lying at an entrance of a parking lot. In the example of FIG. 9, only one-way lanes are provided as indicated by arrows 5. In such a case, the automatically driven vehicle 2 may travel not along a shortest path 6 to the user 3, but along the travel path 7, where the automatically driven vehicle 2 may travel further from the user 3 along part of the travel path 7. Subsequently to step S26, automatic driving is started. More specifically, a process of FIG. 10 is performed.

(Process Performed in Vehicle-Mounted System During Automatic Driving)

Figure 10:
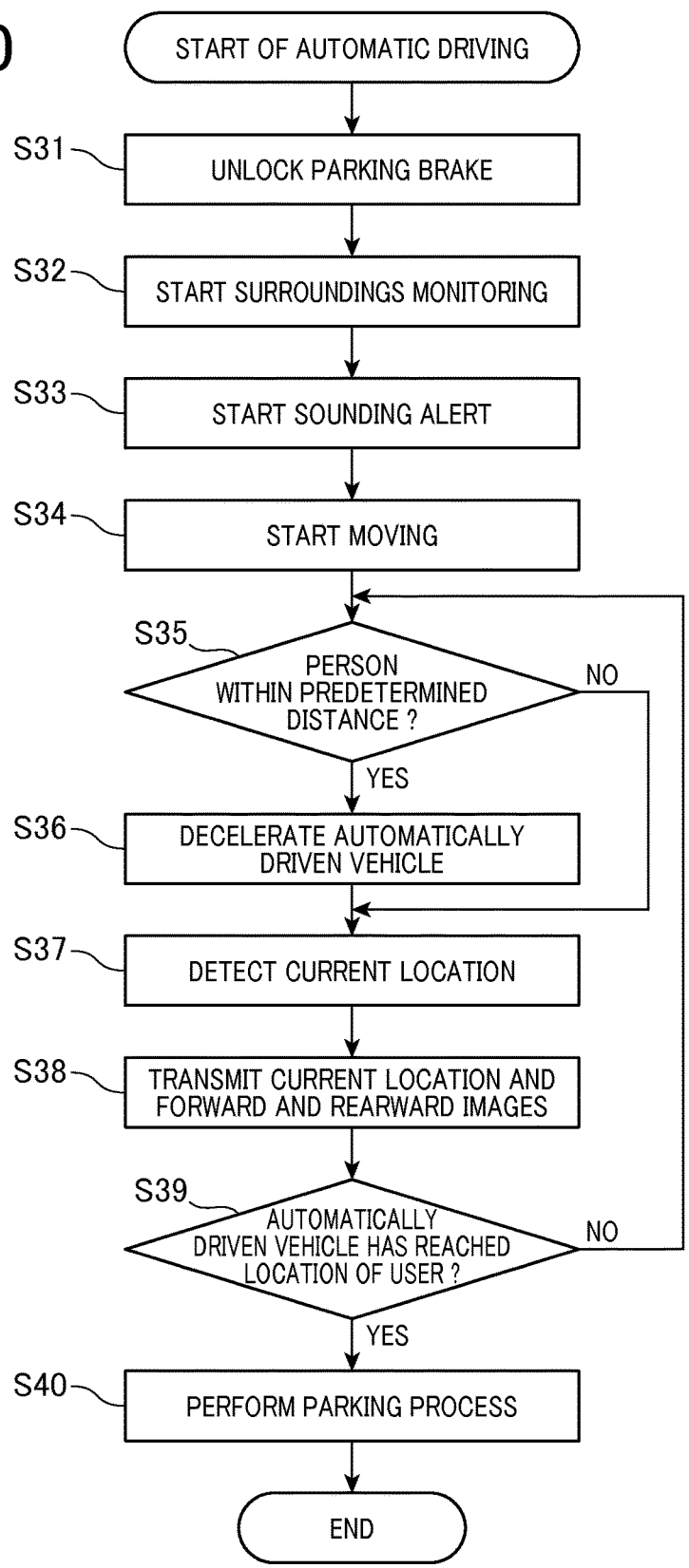
FIG. 10 is a flowchart of a process performed in the controller of the vehicle-mounted system after automatic driving is started in accordance with the first embodiment.

The entire process of FIG. 10 is performed by the automatic-driving control unit 133. In step S31, the brake switching mechanism 124 is activated to release or unlock the parking brake. At the same time, the brake actuator 123 is activated to prevent the wheels from rotating.

In step S32, the surroundings monitoring sensors are activated to start surroundings monitoring. In step S33, sounding an alert from the speaker 114 (as a warning unit) is started to ensure that persons in the parking lot are aware that the automatically driven vehicle 2 is in automatic driving. Thereafter, the speaker 114 sounds the alert periodically.

In step S34, the automatically driven vehicle starts moving or running. The automatically driven vehicle may start moving after a certain period of time elapses after sounding the alert from the speaker 114 is started. This period of time may be several to tens of seconds.

During automatic driving, the steering actuator 120 is used to control a traveling direction of the automatically driven vehicle 2 while controlling the speed of the automatically driven vehicle 2 by controlling the drive-power generator 121 and the brake actuator 123. The automatically driven vehicle 2 thereby travels along the travel path 7 set up prior to the start of automatic driving. During automatic driving, the surroundings monitoring is conducted periodically by using the front-facing camera 102, the rear-facing camera 103, the sonar 104, and the radar 105.

In step S35, based on results of the surroundings monitoring, it is determined whether or not there is a person within a predetermined distance from the automatically driven vehicle 2. The determination may be made by using the surroundings monitoring sensors or may be made not only by using the surroundings monitoring sensors, but also by acquiring a location of the person from the parking lot monitor 10. If in step S35 it is determined that there is a person within the predetermined distance from the automatically driven vehicle 2, then the process proceeds to step S36.

In step S36, the automatically driven vehicle 2 is decelerated so that the person detected around the automatically driven vehicle 2 can pay attention to the presence of the automatically driven vehicle 2. The person detected around the automatically driven vehicle 2 can know that the automatically driven vehicle 2 has recognized the presence of the person. If in step S35 it is determined that there is no person within the predetermined distance from the automatically driven vehicle 2, or after the automatically driven vehicle 2 is decelerated, the process proceeds to step S37.

In step S37, a current location of the automatically driven vehicle 2 is detected. The current location of the automatically driven vehicle 2 is detected using the GNSS receiver 101. Alternatively, the current location of the automatically driven vehicle 2 may be detected based on a trajectory produced by using the vehicle-speed sensor 109, the wheel speed sensor 108, the acceleration sensor 107, the steering angle sensor 111, and a location at which the automatically driven vehicle 2 is parked in the parking lot determined by the parking lot map. The current location of the automatically driven vehicle 2 may be acquired from the parking lot monitor 10 since the parking lot monitor 10 monitors a location of the automatically driven vehicle 2 in the parking lot.

In step S38, a driving condition signal (as an surroundings condition signal) including the current location of the automatically driven vehicle 2 detected in step S37 and the latest forward and rearward images is transmitted from the second near field communication unit 116 or the DCM 106 to the smartphone 40. The forward image is an image captured by the front-facing camera 102, and the rearward image is an image captured by the rear-facing camera 103.

In step S39, it is determined whether or not the automatically driven vehicle 2 has reached the location of the user 3. If in step S39 it is determined that the automatically driven vehicle 2 has not reached the location of the user 3 yet, then the process returns to step S35 and automatic driving is continued. If in step S39 it is determined that the automatically driven vehicle 2 has reached the location of the user 3, then the process proceeds to step S40.

In step S40, a parking process is performed, where the parking brake is locked by deactivating the drive-power generator 121 and activating the brake switching mechanism 124.

(Presentation of Smartphone During Automatic Driving)

The smartphone 40 receives via the near field communication unit 47 or the wide area communication unit 42 (as a receiver) the driving condition signal transmitted in step S38 from the vehicle-mounted system 100.

Figure 11:
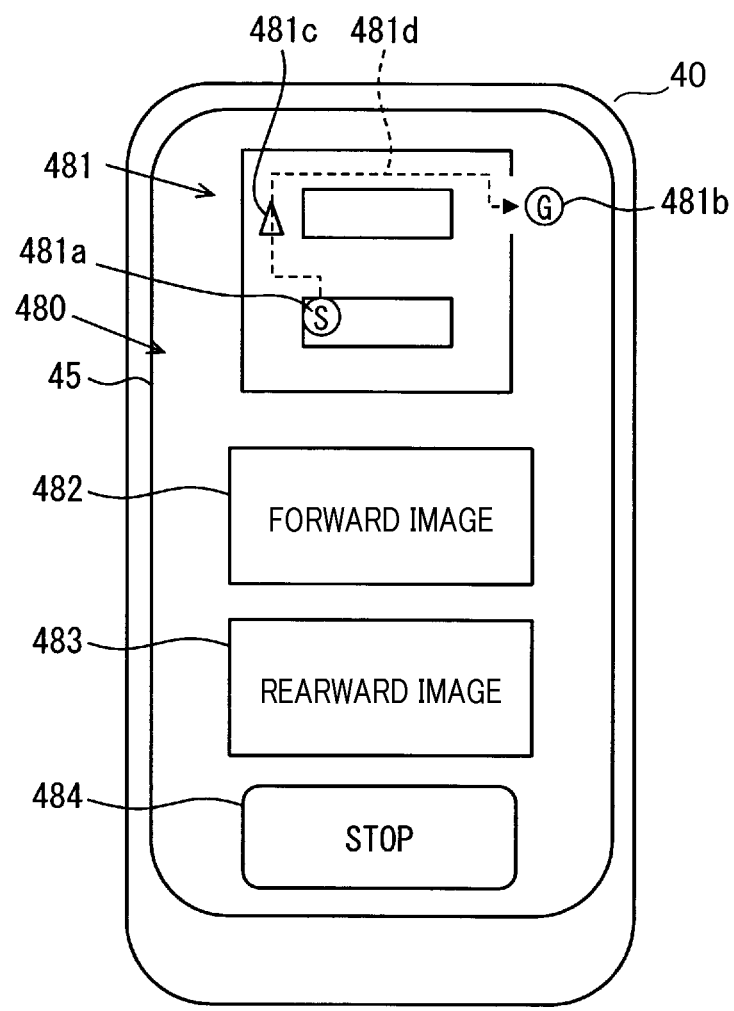
FIG. 11 is an example of a driving condition notification image displayed on a display of the smartphone in accordance with the first embodiment.

Upon receipt of the driving condition signal via the near field communication unit 47 or the wide area communication unit 42, the controller 48 displays a driving condition notification image 480 as shown in FIG. 11 on the display 45. The driving condition notification image 480 includes a location notification image 481, a forward image 482, a rearward image 483, and a stop button 484.

The location notification image 481 is a map image for notifying the user 3 of the current location of the automatically driven vehicle 2, which includes a starting point marking 481a, a destination marking 481b, a current location marking 481c, and a planned route 481d. A position of the current location marking 481c in the location notification image 481 is determined based on the current location of the automatically driven vehicle 2 detected in step S37. The starting point marking 481a represents a location of the automatically driven vehicle 2 at the start of automatic driving. The destination marking 481b represents a location of the smartphone 40. The planned route 481d represents the travel path 7 determined in step S26.

The forward image 482 is the latest forward image captured by the front-facing camera 102. The rearward image 483 is the latest rearward image captured by the rear-facing camera 103. The stop button 484 is a button operated by the user 3 to stop the automatically driven vehicle 2.

The driving condition signal is sequentially transmitted until the automatically driven vehicle 2 arrives at the user 3. Therefore, the driving condition notification image 480 as shown in FIG. 11 is displayed on the display 45 of the smartphone 40 until the automatically driven vehicle 2 arrives at the user 3.

(Advantages)

In the vehicle remote control system 1 of the first embodiment, upon successful authentication with the electronic key 30 (in step S13), the smartphone 40 transmits the automatic driving instruction signal to the vehicle-mounted system 100 (in step S18). If it is determined that the authentication of the automatic driving instruction signal received from the smartphone 40 has succeeded (in step S23), automatic driving is allowed (in step S25). Therefore, the successful authentication of the automatic driving instruction signal received from the smartphone 40 allows it to be determined that the authentication of the electronic key 30, as well as the authentication of the smartphone 40, has succeeded.

Thus, in the present embodiment, the determination that the authentication of the smartphone 40 and the electronic key 30 has succeeded allows the vehicle-mounted system 100 to start automatic driving. With this configuration, even if only the electronic key 30 is stolen, the person who stole the electronic key 30 is unable to operate the console of the smartphone 40 that is remote from the electronic key 30, which can improve the security of the system.

In addition, in the present embodiment, the automatic driving instruction signal is transmitted from the smartphone 40, and the driving condition notification image 480 is displayed on the display 45 of the smartphone 40, where the driving condition notification image 480 indicates the location of the automatically driven vehicle 2 during automatic driving and the images of surroundings of the automatically driven vehicle 2. This configuration allows the user 3 to start automatic driving and monitor the automatically driven vehicle 2 during automatic driving via the smartphone 40.

If automatic driving is disallowed, the disallowance notification is displayed on the display 45 of the smartphone 40.

This allows the user 3 to avoid a situation where the user 3 waits for the automatically driven vehicle 2 to reach the location of the user 3 despite automatic driving having not been started.

When starting automatic driving, the vehicle-mounted system 100 sounds the alert (in step S33) after the successful authentication (in step S23) and prior to the automatically driven vehicle 2 starting to move. This allows a person around the automatically driven vehicle 2 to pay attention to motion of the automatically driven vehicle 2 before the automatically driven vehicle 2 starts to move.

If a person is detected within a predetermined distance from the automatically driven vehicle 2 during automatic driving, the automatically driven vehicle 2 decelerates (in step S36). This allows the person detected around the automatically driven vehicle 2 to know that the automatically driven vehicle 2 has recognized the presence of the person. In addition, the deceleration of the automatically driven vehicle 2 facilitates the person detected around the automatically driven vehicle 2 avoiding the automatically driven vehicle 2.

During automatic driving, the driving condition notification image 480 is displayed on the display 45 of the smartphone 40. Looking at the driving condition notification image 480, the user 3 can know the location of the automatically driven vehicle 2 and surroundings of the automatically driven vehicle 2 until the automatically driven vehicle 2 reaches the location of the user 3. If, looking at the forward image 482 and the rearward image 483, the user 3 determines that the automatically driven vehicle 2 should be stopped, the user 3 may operate the stop button 484 to stop the automatically driven vehicle 2.

Second Embodiment

A second embodiment of the present invention will now be explained. In the present and subsequent embodiments, elements having the same functions as in the first embodiment are assigned the same numbers, except where specified otherwise, and will not be described again for brevity.

In the present embodiment, in step S38 of FIG. 10, a driving condition signal that, instead of the surroundings images, includes an object position detected by the surroundings monitoring sensors is transmitted.

Figure 12:
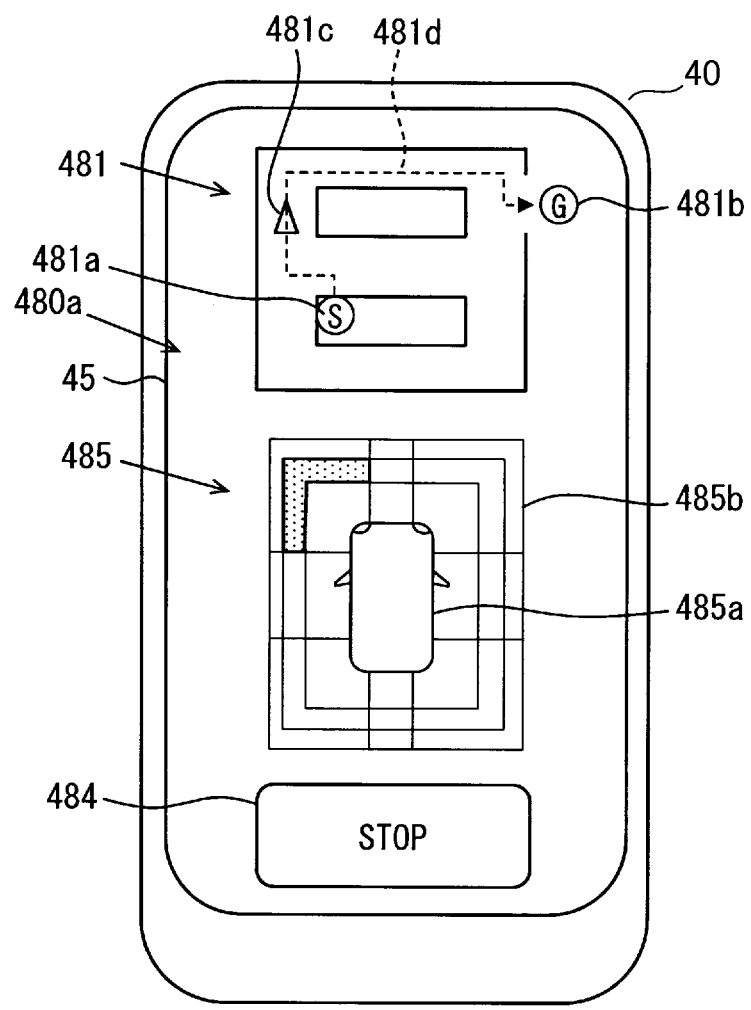
FIG. 12 is an example of a driving condition notification image displayed on a display of a smartphone in accordance with a second embodiment.

Upon receipt of the driving condition signal, the smartphone 40 displays a driving condition notification image 480*a* as shown in FIG. 12 on the display 45.

The driving condition notification image 480*a* includes the location notification image 481 and the stop button 484 that are the same as included in the driving condition notification image 480 of the first embodiment. The driving condition notification image 480*a* includes an object position notification image 485 instead of the forward image 482 and the rearward image 483.

The object position notification image 485 is an image in which a plurality of location notification blocks 485*b* are formed around a profile 485*a* of the automatically driven vehicle 2. A location notification block 485*b* corresponding to the object position included in the driving condition signal is different in color from another location notification block 485*b* in which there is no object.

In the second embodiment, the driving condition notification image 480*a* as shown in FIG. 12 is displayed on the display 45 of the smartphone 40. Therefore, if, looking at the position notification image 485, the user 3 determines that the automatically driven vehicle 2 has to be stopped, the user 3 can stop the automatically driven vehicle 2 by operating the stop button 484.

Third Embodiment

Figure 13:
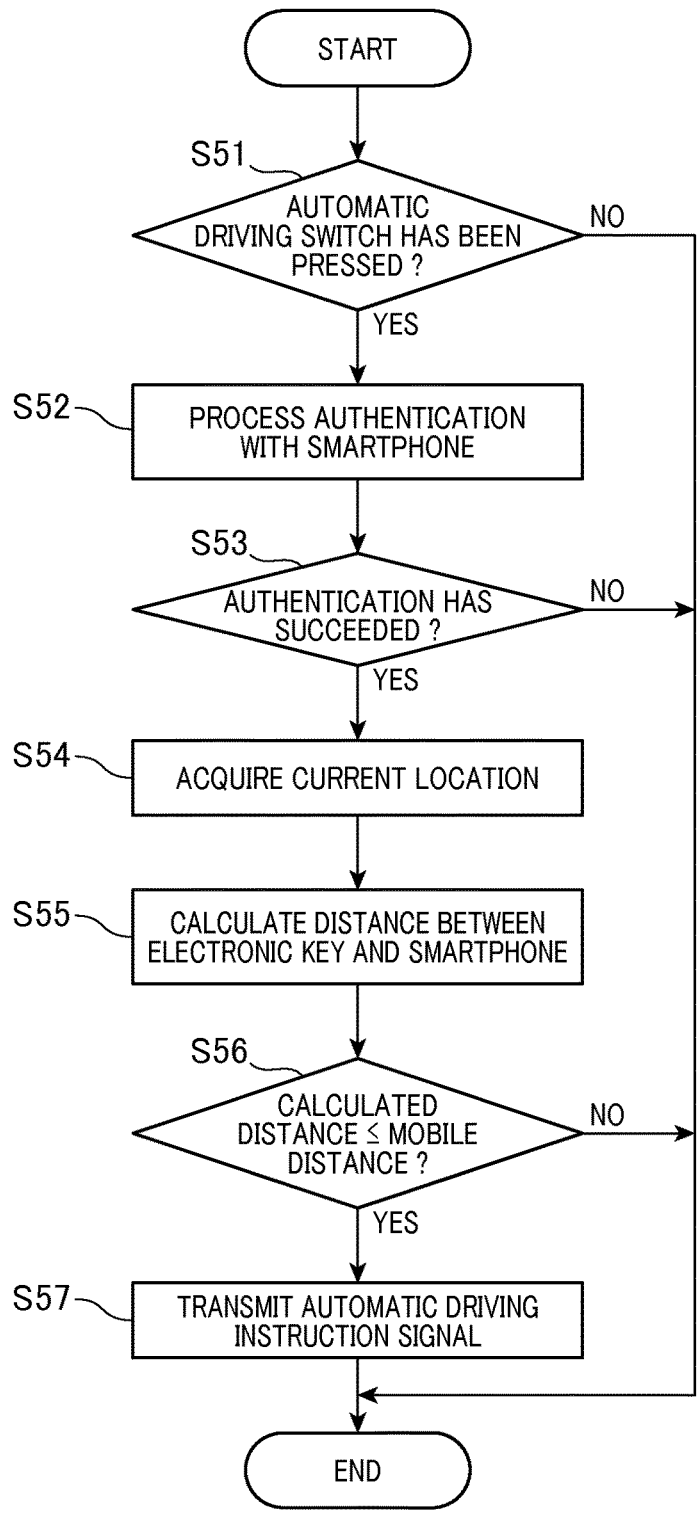
FIG. 13 is a flowchart of a process performed in a controller of an electronic key in accordance with a third embodiment.

A third embodiment of the present invention will now be explained. In the third embodiment, the electronic key 30 performs authentication with the smartphone 40 and transmits an automatic driving instruction signal, where the controller 38 of the electronic key 30 performs a process shown in FIG. 13 periodically. The controller 38 of the electronic key 30 includes a primary authentication unit 38*a* and a transmit processing unit 38*b*. The primary authentication unit 38*a* of the electronic key 30 is responsible for execution of steps S51-S56, and the transmit processing unit 38*b* of the electronic key 30 is responsible for execution of step S57.

In step S51, it is determined whether or not the automatic driving switch 35*c* has been pressed. If it is determined that the automatic driving switch 35*c* has not been pressed, then the process of FIG. 13 ends. If it is determined that the automatic driving switch 35*c* has been pressed, then the process proceeds to step S52.

In step S52, the electronic key 30 communicates with the smartphone 40 to perform the authentication, where it is determined whether or not the electronic key 30 and the smartphone 40 have been pre-registered with each other. This authentication may be performed beforehand as in step S12.

In step S53, it is determined whether or not the authentication has succeeded. If it is determined that the authentication has failed, the process of FIG. 13 ends. If it is determined that the authentication has succeeded, then the process proceeds to step S54.

In step S54, a current location of the electronic key 30 is acquired. The current location of the electronic key 30 may be acquired from the GNSS receiver 34 of the electronic key 30 or from the smartphone 40. In the configuration where the current location of the electronic key 30 is acquired from the smartphone 40, the GNSS receiver 34 may be removed from the electronic key 30.

In step S55, a distance between the electronic key 30 and the smartphone 40 is calculated. For example, the distance between the electronic key 30 and the smartphone 40 may be calculated based on the strength of a radio wave transmitted by the near field communication unit 47 of the smartphone 40 and then received by the near field communication unit 33 of the electronic key 30. Alternatively, the distance between the electronic key 30 and the smartphone 40 may be calculated from the current locations detected by the GNSS receivers 34, 41 of the electronic key 30 and the smartphone 40.

In step S56, it is determined whether or not the distance calculated in step S55 is equal to or less than the mobile distance (being the same as defined in the first embodiment). Alternatively, as in the first embodiment, step S55 may be skipped, and in step S56, it may be determined whether or not the distance between the electronic key 30 and the smartphone 40 is equal to or less than the mobile distance by comparing the strength of the received radio wave with a predetermined threshold. If in step S56 it is determined that the distance between the electronic key 30 and the smartphone 40 is greater than the mobile distance, then the process ends. If in step S56 it is determined that the distance between the electronic key 30 and the smartphone 40 is equal to or less than the mobile distance, then the process of FIG. 13 proceeds to step S57.

In step S57, an automatic driving instruction signal (as an authentication signal) including the current location acquired in step S54 and a code used to authenticate the electronic key 30 is transmitted from the near field communication unit 47 or from the UHF transmitter 32 to the vehicle-mounted system 100.

In the second embodiment, as in the first embodiment, the vehicle-mounted system 100 performs the process of FIG. 8 to determine whether to allow automatic driving. An allowance or disallowance notification may be transmitted to the electronic key 30 or the smartphone 40. When the disallowance notification is transmitted to the electronic key 30, an indication that automatic driving has been disallowed is displayed on display 36. Meanwhile, after automatic driving is started, the process of FIG. 10 is performed.

Fourth Embodiment

Figure 14:
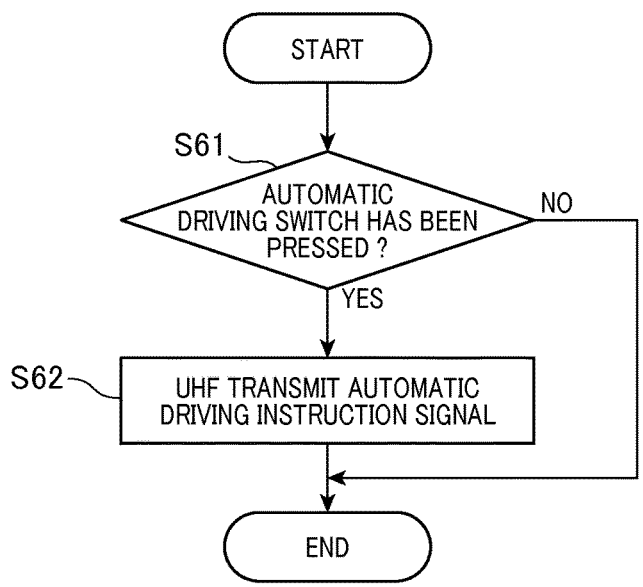
FIG. 14 is a flowchart of a process performed in a controller of an electronic key in accordance with a fourth embodiment.

A fourth embodiment of the present invention will now be explained. In the fourth embodiment, the controller 38 of the electronic key 30 performs a process shown in FIG. 14 periodically. In the fourth embodiment, the electronic key 30 serves as a primary communication device, and the smartphone 40 serves as a secondary communication device.

In step S61, it is determined whether or not the automatic driving switch 35c has been pressed. If it is determined that the automatic driving switch 35c has not been pressed, then the process of FIG. 14 ends. If it is determined that the automatic driving switch 35c has been pressed, then the process of FIG. 14 proceeds to step S62.

In step S62, an automatic driving instruction signal is transmitted from the UHF transmitter 32 of the electronic key 30. The automatic driving instruction signal includes a signal indicative of automatic driving, and further includes a code used to authenticate the electronic key 30 as included in a signal transmitted from an electronic key of a well-known electronic key system. Therefore, the automatic driving instruction signal serves as an authentication signal. In the fourth embodiment, the automatic driving instruction signal includes no current location of the electronic key 30.

When the signal transmitted by the UHF transmitter 32 is the automatic driving instruction signal, the automatic driving instruction signal may have higher transmission power with a longer communication distance as compared with when the signal transmitted by the UHF transmitter 32 is a signal indicative of locking or unlocking of vehicle doors.

Figure 15:
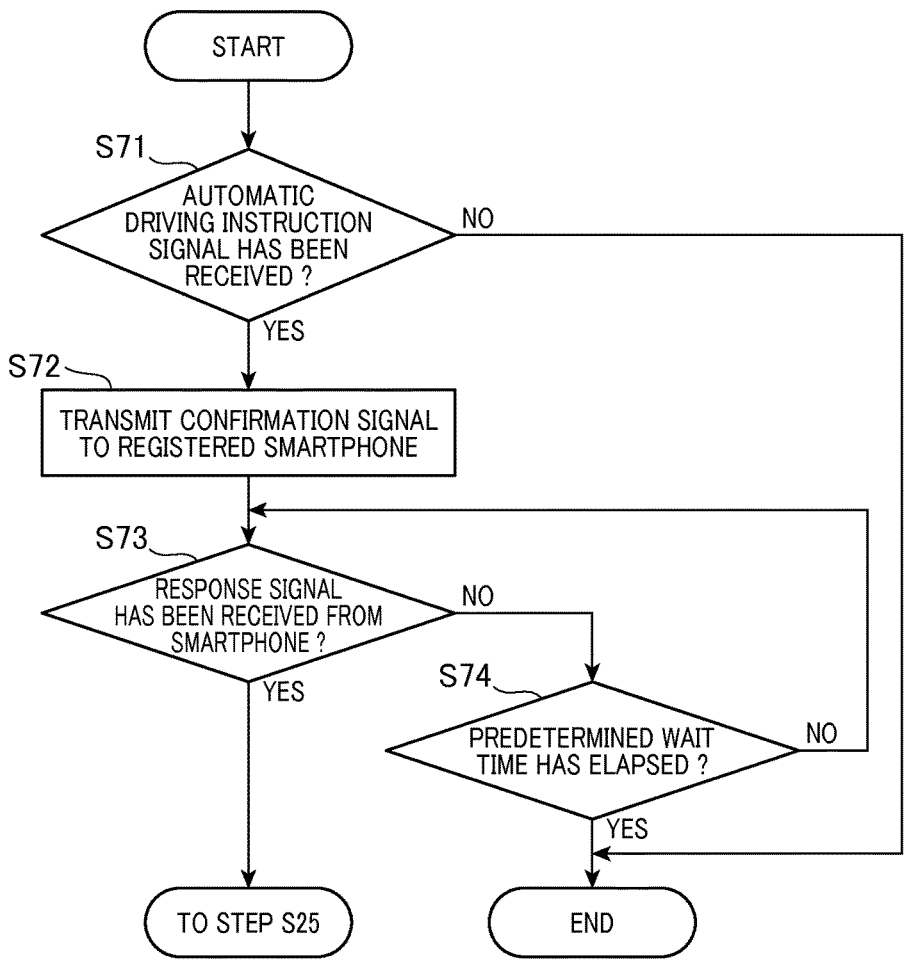
FIG. 15 is a flowchart of a process performed in a controller of the vehicle-mounted system in accordance with the fourth embodiment.

The authentication unit 131 of the controller 130 of the vehicle-mounted system 100 performs a process shown in FIG. 15 periodically. In step S71, it is determined whether or not automatic driving instruction signal transmitted from the electronic key 30 has been received by the first near field communication unit 115. If it is determined that the automatic driving instruction signal has not been received by the first near field communication unit 115, then the process of FIG. 15 ends. If it is determined that the automatic driving instruction signal has been received by the first near field communication unit 115, then the process proceeds to step S72.

In step S72, a confirmation signal is transmitted to the registered smartphone 40 to confirm whether or not the automatic driving instruction signal has been transmitted by a normal user 3. When the confirmation signal is received by the smartphone 40 and the start instruction button is pressed, a response signal is transmitted from the smartphone 40.

In step S73, it is determined whether or not the response signal transmitted from the registered smartphone 40 has been received by the second near field communication unit 116. In the fourth embodiment, the first near field communication unit 115 and the second near field communication unit 116 serves as a receiver.

If in step S73 it is determined that the response signal transmitted from the registered smartphone 40 has been received by the second near field communication unit 116, it can be considered that the authentication between the electronic key 30 and the smartphone 40 has succeeded. Then, the process proceeds to step S25 of FIG. 8. If in step S73 it is determined that the response signal transmitted from the registered smartphone 40 has not been received by the second near field communication unit 116, the process proceeds to step S74.

In step S74, it is determined whether or not a predetermined wait time has elapsed since the transmission of the confirmation signal. If in step S74 it is determined that the predetermined wait time has not elapsed yet since the transmission of the confirmation signal, the process returns to step S73. If in step S74 it is determined that the predetermined wait time has elapsed since the transmission of the confirmation signal, the process of FIG. 15 ends.

Figure 16:
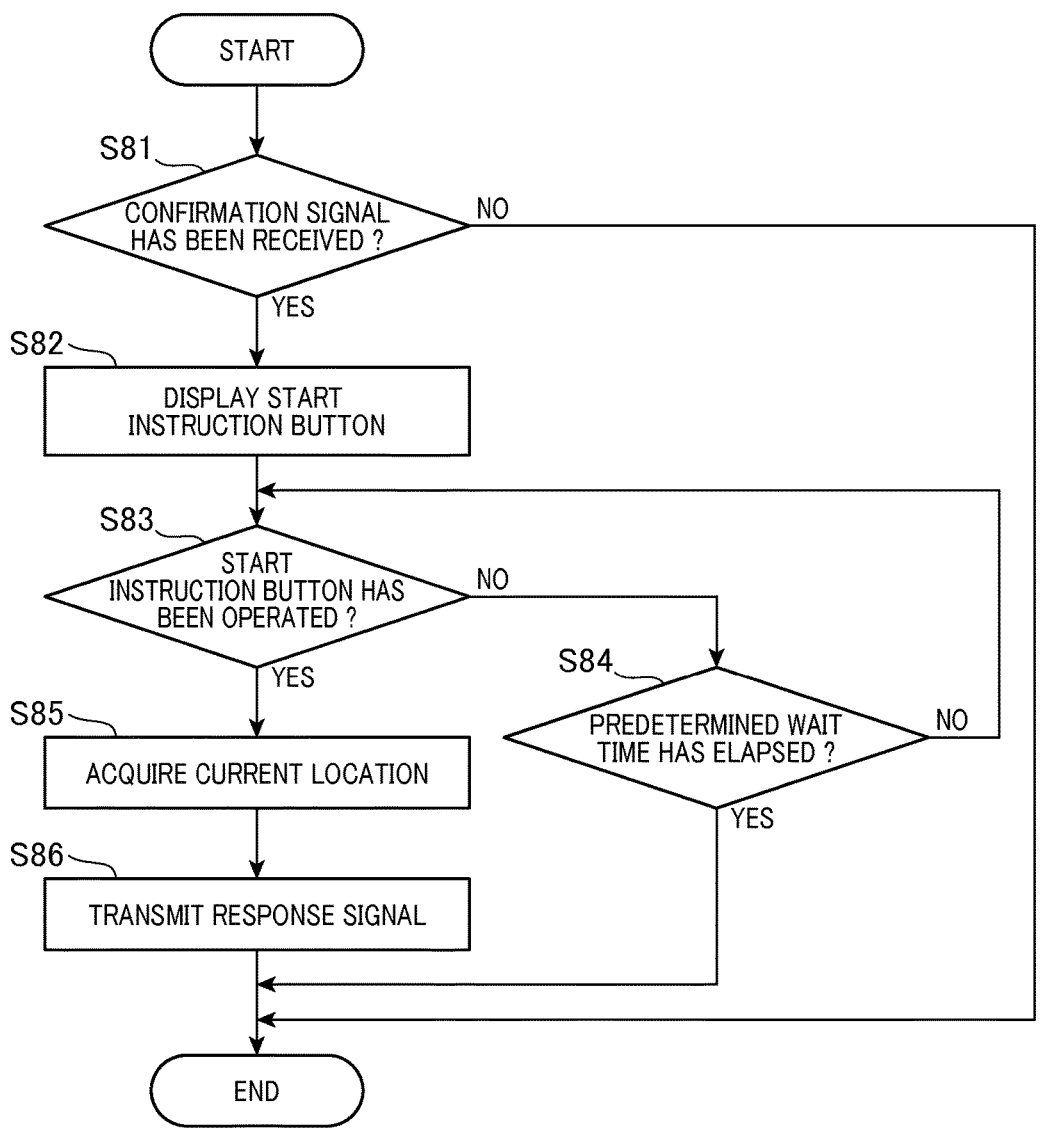
FIG. 16 is a flowchart of a process performed in a controller of a smartphone in accordance with the fourth embodiment.

The controller 48 of the smartphone 40 performs a process shown in FIG. 16 periodically while the automatic driving application 43a is activated. The automatic driving application 43a may be a resident application or a user-activated application.

In step S81, it is determined whether or not the confirmation signal transmitted from the vehicle-mounted system 100 in step S72 of FIG. 15 has been received. If in step S81 it is determined that the confirmation signal has not been received, then the process of FIG. 16 ends. If in step S81 it is determined that the confirmation signal has been received, then the process of FIG. 16 proceeds to step S82.

In step S82, a start instruction button is displayed on the display 45. In step S83, it is determined whether or not the start instruction button has been operated. If it is determined that the start instruction button has not been operated, then the process proceeds to step S84.

In step S84, it is determined whether or not a predetermined wait time has elapsed since the receipt of the confirmation signal. If it is determined that the predetermined wait time has not elapsed yet since the receipt of the confirmation signal, then the process returns to step S83. If it is determined that the predetermined wait time has elapsed since the receipt of the confirmation signal, then the process of FIG. 16 proceeds to step S85.

In step S85, a current location of the smartphone 40 is acquired from the GNSS receiver 41. In step S86, a response signal including the current location acquired in step S85 is transmitted from the near field communication unit 47 to the vehicle-mounted system 100. As described above, in step S73, it is determined that the response signal has been received by the vehicle-mounted system 100.

(Advantages)

In the fourth embodiment, the electronic key 30 is configured to transmit the automatic driving instruction signal via the UHF transmitter 32 and the automatic driving instruction signal does not include the current location of the electronic key 30. The UHF transmitter 32 may be included in an electronic key of a well-known electronic key system. Therefore, in the fourth embodiment, the electronic key 30 may have a small change in configuration from the electronic key of the well-known electronic key system.

In the fourth embodiment, the electronic key 30 is configured such that the automatic driving instruction signal has higher transmission power as compared with a signal indicative of locking or unlocking of vehicle doors. Therefore, in the fourth embodiment, the electronic key 30 may have a smaller change in configuration from the electronic key of the well-known electronic key system as compared with an electronic key provided with an additional communication unit operable in a different communication scheme based on a different frequency band different from the UHF band.

In addition, automatic driving can be started only when the vehicle-mounted system 100 receives the response signal transmitted by the registered smartphone 40 in response to the confirmation signal from the vehicle-mounted system 100. This can increases the security of the system.

(Modifications)

It is to be understood that the invention is not to be limited to the specific embodiment disclosed above and that modifications and other embodiments are intended to be included within the scope of the appended claims.

(First Modification)

In each of the first to fourth embodiments, the controller 130 of the vehicle-mounted system 100 includes the automatic-driving control unit 133 as an activation unit. The allowance determination unit 132 is configured to allow operation of the activation unit. Alternatively, the activation unit may be a door lock unit to lock or unlock the vehicle doors, an engine control unit to start the engine of the vehicle, or a program updater to update a program of a controller mounted in the vehicle.

(Second Modification)

In each of the first and second embodiments, during automatic driving, the vehicle-mounted system 100 establishes the communication with the smartphone 40 and then sequentially transmits the driving condition signal to the smartphone 40. If the communication is interrupted, the automatic-driving control unit 133 may halt automatic driving. When automatic driving is halted, the automatically driven vehicle 2 is stopped. Preferably, if the communication with the vehicle-mounted system 100 is interrupted during automatic driving, the smartphone 40 may display on the display 45 an indication that automatic driving has been halted.

(Third Modification)

The electronic key 30 and the smartphone 40 may be each provided with an infrared communication unit and/or a near field communication unit for communicating with each other.

(Fourth Modification)

In each of the first to fourth embodiments, the smartphone 40 and the vehicle-mounted system 100 communicate directly with each other, and the electronic key 30 and the vehicle-mounted system 100 communicate directly with each other. Alternatively, the smartphone 40 and the vehicle-mounted system 100 may communicate indirectly with each other via the central server 20 or the parking lot monitor 10. The electronic key 30 and the vehicle-mounted system 100 may communicate indirectly with each other via the parking lot monitor 10 or the smartphone 40.

(Fifth Modification)

In a modification to the fourth embodiment, the process performed in the electronic key 30 (steps S61-S62 of FIG. 14) and the process performed in the smartphone 40 (steps S81 to S86 of FIG. 16) may be exchanged. In such a modification, the smartphone 40 serves as a primary communication device, and the electronic key 30 serves as a secondary communication device.

What is claimed is:

1. A vehicle remote control system comprising:
   an electronic key pre-registered as a device via which a vehicle can be remote-operated;
   a mobile communication device pre-registered as a device that belongs to a user of the vehicle;
   a vehicle-mounted authentication unit configured to determine whether or not authentication of the electronic key and the mobile communication device has succeeded; and
   a vehicle-mounted allowance determination unit configured to, if it is determined by the vehicle-mounted authentication unit that the authentication of the electronic key and the mobile communication device has succeeded, allow operation of a predetermined vehicle-mounted activation unit,
   wherein at least one of the electronic key and the mobile communication device comprises:
   a primary authentication unit configured to, if determining that a distance between the electronic key and the mobile communication device is equal to or less than a mobile distance defined such that, if the distance between the electronic key and the mobile communication device is equal to or less than the mobile distance, both the electronic key and the mobile communication device are communicable with each other and carried by the user, determine that authentication between the electronic key and the mobile communication device has succeeded; and
   a transmit processing unit configured to, if it is determined by the primary authentication unit that the authentication between the electronic key and the mobile communication device has succeeded, transmit to the vehicle via a transmitter an authentication signal including a signal indicative of the electronic key and the mobile communication device being pre-registered devices,
   wherein the vehicle-mounted authentication unit is configured to, upon receipt of the authentication signal, authenticate the authentication signal, and upon successful authentication of the authentication signal, determine that the authentication of the electronic key and the mobile communication device has succeeded.

2. The system of claim 1, wherein
   a primary communication device that is one of the electronic key and the mobile communication device is configured to transmit to the vehicle an authentication signal including a signal indicative of the one of the electronic key and the mobile communication device being a pre-registered device, and
   the vehicle-mounted authentication unit is configured to, upon receipt of the authentication signal at a receiver mounted in the vehicle, transmit a confirmation signal to a secondary communication device that is the other of the electronic key and the mobile communication device, and if the receiver has received a response signal transmitted from the secondary communication device in response to the confirmation signal, determine that authentication of the electronic key and the mobile communication device has succeeded.

3. The system of claim 1, wherein the activation unit is an automatic-driving control unit for controlling automatic driving of the vehicle.

4. The system of claim 3, wherein
   the automatic-driving control unit is configured to, during automatic driving of the vehicle, sequentially acquire a surroundings condition of the vehicle and sequentially transmit to the mobile communication device a surroundings condition signal indicative of the acquired surroundings condition, and the mobile communication device comprises a receiver configured to receive the surroundings condition signal, and a display configured to display the surroundings condition based on the surroundings condition signal received by the receiver.

5. The system of claim 4, wherein the mobile communication device is configured to transmit to the automatic-driving control unit an automatic driving instruction signal for instructing the automatic-driving control unit to start automatic driving, and the vehicle-mounted authentication unit is configured to, upon receipt of the automatic driving instruction signal, authenticate the electronic key and the mobile communication device.

6. The system of claim 3, wherein the allowance determination unit is configured to, if disallowing operation of the automatic-driving control unit, transmit a disallowance signal indicative of disallowance of automatic driving via a vehicle-mounted transmitter, and at least one of the electronic key and the mobile communication device comprises a display configured to, upon receipt of the disallowance signal, display thereon an indication that the operation of the automatic-driving control unit has been disallowed.

7. The system of claim 1, wherein the activation unit includes a door lock unit to lock or unlock vehicle doors, an engine control unit to start the engine of the vehicle, or a program updater to update a program of a controller mounted in the vehicle.

8. A vehicle-mounted apparatus incorporated in a vehicle remote control system including an electronic key pre-registered as a device via which a vehicle can be remote-operated and a mobile communication device pre-registered as a device that belongs to a user of the vehicle, the apparatus comprising:

a vehicle-mounted authentication unit configured to determine whether or not authentication of the electronic key and the mobile communication device has succeeded; and a vehicle-mounted allowance determination unit configured to, if it is determined by the vehicle-mounted authentication unit that the authentication of the electronic key and the mobile communication device has succeeded, allow operation of a predetermined vehicle-mounted activation unit, wherein at least one of the electronic key and the mobile communication device comprises:

a primary authentication unit configured to, if determining that a distance between the electronic key and the mobile communication device is equal to or less than a mobile distance defined such that, if the distance between the electronic key and the mobile communication device is equal to or less than the mobile distance, both the electronic key and the mobile communication device are communicable with each other and carried by the user, determine that authentication between the electronic key and the mobile communication device has succeeded; and a transmit processing unit configured to, if it is determined by the primary authentication unit that the authentication between the electronic key and the mobile communication device has succeeded, transmit to the vehicle via a transmitter an authentication signal including a signal indicative of the electronic key and the mobile communication device being pre-registered devices, the vehicle-mounted authentication unit is configured to, upon receipt of the authentication signal, authenticate the authentication signal, and upon successful authentication of the authentication signal, determine that the authentication of the electronic key and the mobile communication device has succeeded.

* * * * *